(12) United States Patent
Schwenter et al.

(10) Patent No.: US 11,226,222 B2
(45) Date of Patent: Jan. 18, 2022

(54) VIBRATORY MEASURING DEVICE HAVING A MEASURING TUBE

(71) Applicant: Endress+Hauser Flowtec AG, Reinach (CH)

(72) Inventors: Benjamin Schwenter, Breitenbach (CH); Christof Huber, Bern (CH); Christian Schütze, Basel (CH); Achim Wiest, Weil am Rhein (DE)

(73) Assignee: Endress+Hauser Flowtec AG, Reinach (CH)

( * ) Notice: Subject to any disclaimer, the term of this patent is extended or adjusted under 35 U.S.C. 154(b) by 37 days.

(21) Appl. No.: 16/958,942

(22) PCT Filed: Dec. 17, 2018

(86) PCT No.: PCT/EP2018/085199
§ 371 (c)(1),
(2) Date: Jun. 29, 2020

(87) PCT Pub. No.: WO2019/129522
PCT Pub. Date: Jul. 4, 2019

(65) Prior Publication Data
US 2020/0340841 A1 Oct. 29, 2020

(30) Foreign Application Priority Data

Dec. 28, 2017 (DE) .......................... 102017012058.7

(51) Int. Cl.
*G01F 1/84* (2006.01)
*G01N 9/00* (2006.01)
(52) U.S. Cl.
CPC ............ *G01F 1/8477* (2013.01); *G01F 1/844* (2013.01); *G01F 1/8413* (2013.01);
(Continued)

(58) Field of Classification Search
CPC .... G01F 1/8413; G01F 1/8422; G01F 1/8427; G01F 1/8472
See application file for complete search history.

(56) References Cited

U.S. PATENT DOCUMENTS 4,803,867 A 2/1989 Dahlin
5,700,958 A * 12/1997 Lew ...................... G01F 1/8413
73/861.357

(Continued)

FOREIGN PATENT DOCUMENTS

CN 205981316 U 2/2017
DE 1319930 T1 11/2003
(Continued)

*Primary Examiner* — Erika J Villaluna
(74) *Attorney, Agent, or Firm* — Christopher R. Powers; Endress+Hauser (USA) Holding Inc.

(57) ABSTRACT

A vibratory measuring device for determining a mass flow rate or a density of a medium includes: a vibratory measuring tube which is curved when in a rest position; a support body; a first bearing body; a second bearing body; two exciter units and two sensor units; and a circuit. The bearing bodies are connected to the support body such that flexural vibration modes of the measuring tube have vibration nodes on the bearing bodies, wherein the exciter units are configured to excite flexural vibrations of the measuring tube, wherein the sensor units are each configured to detect flexural vibrations of the measuring tube both in and perpendicular to the plane and to output vibration-dependent sensor signals, wherein the circuit is configured to output excitation signals to the excitation units for the selective excitation of flexural vibration modes and to receive the sensor signals of the sensor units.

14 Claims, 4 Drawing Sheets

(52) U.S. Cl.
CPC .......... *G01F 1/8422* (2013.01); *G01F 1/8431* (2013.01); *G01F 1/8472* (2013.01); *G01N 9/002* (2013.01); *G01F 1/8427* (2013.01)

(56) References Cited

U.S. PATENT DOCUMENTS

| | | |
|---|---|---|
| 6,164,140 A | 12/2000 | Kalinoski |
| 6,513,392 B1 | 2/2003 | Barger et al. |
| 6,782,764 B2 | 8/2004 | Osawa |
| 2003/0131669 A1 | 7/2003 | Osawa |
| 2006/0243067 A1 | 11/2006 | Mehendale et al. |
| 2007/0095151 A1 | 5/2007 | Kitami |
| 2008/0156109 A1 | 7/2008 | Nakao et al. |

FOREIGN PATENT DOCUMENTS

| | | |
|---|---|---|
| DE | 102005059070 A1 | 6/2007 |
| DE | 102010030332 A1 | 12/2011 |
| DE | 102013102711 A1 | 9/2014 |
| DE | 102015203183 A1 | 8/2016 |
| EP | 1223412 A1 | 7/2002 |
| JP | 2004108916 A | 4/2004 |
| JP | 2004125647 A | 4/2004 |
| WO | 2016134887 A1 | 9/2016 |

\* cited by examiner

OOP 1

OOP 2

OOP 3

OOP 4

OOP 5

IP 1

IP2

IP 3

IP 4

VIBRATORY MEASURING DEVICE HAVING A MEASURING TUBE

CROSS-REFERENCE TO RELATED APPLICATIONS

The present application is related to and claims the priority benefit of German Patent Application No. 10 2017 012 058.7, filed on Dec. 28, 2017 and International Patent Application No. PCT/EP2018/085199, filed on Dec. 17, 2018, the entire contents of which are incorporated herein by reference.

TECHNICAL FIELD

The present invention relates to a vibratory measuring device comprising a measuring tube, in particular for determining the mass flow rate and/or the density of a flowable medium.

BACKGROUND

Sensors of the type in question are described, for example, in DE 10 2005 059 070 A1 and EP 1 223 412 A1.

Measuring devices comprising curved measuring tubes are usually configured to be excited, in flexural vibration desired modes, perpendicularly to a measuring tube plane, in which a measuring tube center line of the curved measuring tube extends. This is unproblematic in the case of sensors comprising two measuring tubes that extend in parallel, since the two measuring tubes vibrate essentially symmetrically with respect to a sensor center plane, whereby the inertial forces of the vibrating measuring tubes compensate for each other; as a result, almost no vibration energy is therefore decoupled from the sensor. However, in the case of sensors comprising only one curved measuring tube, bending vibration desired modes perpendicular to the measuring tube plane are problematic, since these are not readily balanced, which is why vibration energy can be decoupled. In order to reduce this effect, EP 1 223 412 A1 discloses a sensor comprising a trapezoidally curved measuring tube, which is configured to be excited into bending vibration modes in the measuring tube plane. The excitation can also be effected by piezoelectric exciters.

Liquid measuring media containing gas bubbles, in particular in the form of microbubbles which are suspended in the measuring medium, can impair a measurement, since the microbubbles significantly increase the compressibility of the measuring medium, but have a small influence on the effective density thereof. This leads to a greatly reduced sound velocity or resonance frequency, with which the measuring medium can vibrate against the measuring tube. As the resonance frequency approaches a desired mode natural frequency, the latter is thereby changed, and the vibration in the bending vibration desired mode is strongly attenuated. This results in a dilemma for the sensor design, because, on the one hand, an influence of a vibration mode by the medium provides an approach for obtaining information about media properties, and, on the other hand, the influence of a bending vibration mode can be so strong that the excitation thereof is no longer possible. This can initially be relevant in bending vibration desired modes in the measuring tube plane, since these usually have a higher desired mode natural frequency than bending vibration desired modes perpendicular to the measuring tube plane.

SUMMARY

The object of the present invention is, therefore, to find a remedy.

The object is achieved by the measuring device according to independent claim 1.

The measuring device according to the invention comprises:

a vibratory measuring tube that is bent in the rest position thereof for guiding a medium, wherein the measuring tube has a measuring tube center line extending in a measuring tube plane;

a support body;

a first inlet-side bearing body;

a second outlet-side bearing body;

a first inlet-side exciter unit;

a second outlet-side exciter unit;

a first inlet-side sensor unit;

a second outlet-side sensor unit; and an operation and evaluation circuit;

wherein the first and second bearing bodies are connected to the support body, wherein the measuring tube is supported on the first and second bearing bodies in such a way that bending vibration modes of the measuring tube have vibration nodes at the bearing bodies, wherein the first and second exciter units are each configured to excite bending vibrations of the measuring tube both in the measuring tube plane and perpendicular to the measuring tube plane as a function of excitation signals, wherein the first and second sensor units are each configured to detect bending vibrations of the measuring tube both in the measuring tube plane and perpendicular to the measuring tube plane, and to output vibration-dependent sensor signals, wherein the operation and evaluation circuit is configured to output excitation signals to the exciter units for the selective excitation of bending vibration modes, and to receive the sensor signals of the sensor units.

In a further development of the invention, the measuring tube center line either extends symmetrically with respect to a measuring tube transverse plane, which is perpendicular to the measuring tube plane, or has a two-fold rotational symmetry with respect to an axis of symmetry extending perpendicularly to the measuring tube plane, wherein the operation and evaluation circuit is configured to output excitation signals to the exciter units to excite and/or evaluate symmetrical bending vibration modes and/or antisymmetrical bending vibration modes, in particular with antisymmetrical deflection.

By exciting bending vibration modes in the measuring tube plane and perpendicularly thereto, a larger supply of possible natural frequencies is available which, on the one hand, are close enough to the resonance frequency of the medium to be influenced thereby and, on the other hand, are not yet excessively attenuated. In this respect, it is always possible to excite two or more bending vibration modes, the vibration behavior of which allows medium properties such as the sound velocity, gas loading and density thereof to be reliably determined.

In a further development of the invention, the exciter units and sensor units are arranged so as to adjoin the bearing bodies or are integrated therein. In this way, an ideal state, in which the exciter units and sensor units for the N bending vibration modes having the N lowest natural frequencies have a vibration node, can be most easily approximated; for example, N can be no less than 5, in particular no less than 8. If the exciter units and/or sensor units have a vibration node for a bending vibration mode, they can excite or detect it particularly effectively.

In a further development of the invention, the measuring tube has a homogeneous mass distribution between the first exciter unit and the second exciter unit, or between the first sensor unit and the second sensor unit, wherein a deviation from the homogeneous mass distribution is given at a trim point at the location of a vibration node of antisymmetrical bending vibration modes, and/or, symmetrically thereto, a deviation from the homogeneous mass distribution is given at two vibration nodes of a symmetrical bending vibration mode which are symmetrical to one another. The deviation from the homogeneous mass distribution is effected, in particular by means of a respective additional mass. In this way, a decrease in the natural frequencies is achieved for those vibration modes, which have no vibration node at the location of the additional mass, while those modes in which a vibration node coincides with the additional mass are barely influenced by the latter. Frequency spacings between vibration modes can thus be influenced in a controlled manner by means of the additional masses.

In a further development of the invention, the bending vibration modes have natural frequencies $f_i$, wherein in each case an amplitude $A_i$ of a bending vibration mode which is dependent on an excitation frequency $f_a$ is given as $$A_i(f_a, f_i, Q_i) = \frac{k_i}{\left[\left(1-\left(\frac{f_a}{f_i}\right)^2\right)^2 + \left(\frac{\left(\frac{f_a}{f_i}\right)}{Q_i}\right)^2\right]^{1/2}},$$

where $k_i$ is a mode-specific constant, $Q_i$ describes a mode-specific quality of the measuring tube, wherein the following applies for the N bending vibration modes having the N lowest natural frequencies $f_i$, $f_j$:

$$\frac{A_i\left(\frac{f_i + f_j}{2}, f_i, Q_i\right)}{k_i \cdot Q_i} < s,$$

with s<2%, for example s<1%, in particular s<0.5%, and with N≥5, for example N≥8, in particular N≥10.

In a further development of the invention, the operation and evaluation circuit is configured to excite only bending vibration modes having natural frequencies $f_i$, $f_j$ for which the following applies:

$$\frac{A_i\left(\frac{f_i + f_j}{2}, f_i, Q_i\right)}{k_i \cdot Q_i} < s,$$

with s<1%, for example s<0.5%, in particular s<0.25%.

In a further development of the invention, the measuring tube has an internal diameter that measures no more than 4 mm, for example no more than 2 mm, in particular no more than 1 mm, and in particular cases no more than 0.5 mm.

In a further development of the invention, the exciter units each comprise at least two piezoelectric elements, which are to be selectively driven by the operation and evaluation circuit by way of an excitation signal.

In a further development of the invention, the sensor units each comprise at least two piezoelectric elements, the signals of which can be detected by the operation and evaluation circuit.

In a further development of the invention, the first sensor unit and the first exciter unit are integrated into a first sensor-exciter unit, and the second sensor unit and the second exciter unit are integrated into a second sensor-exciter unit.

In a further development of the invention, the sensor-exciter units comprise piezoelectric elements, which are each configured to act both as an exciter and as a sensor.

In a further development of the invention, the sensor-exciter units comprise first piezoelectric elements, which are configured to act as exciters, and wherein the sensor-exciter units comprise second piezoelectric elements, which are configured to act as exciters.

BRIEF DESCRIPTION OF THE DRAWINGS

The invention is explained in the following in further detail on the basis of the exemplary embodiments shown in the figures. The following are shown.

DETAILED DESCRIPTION

Figure 1:
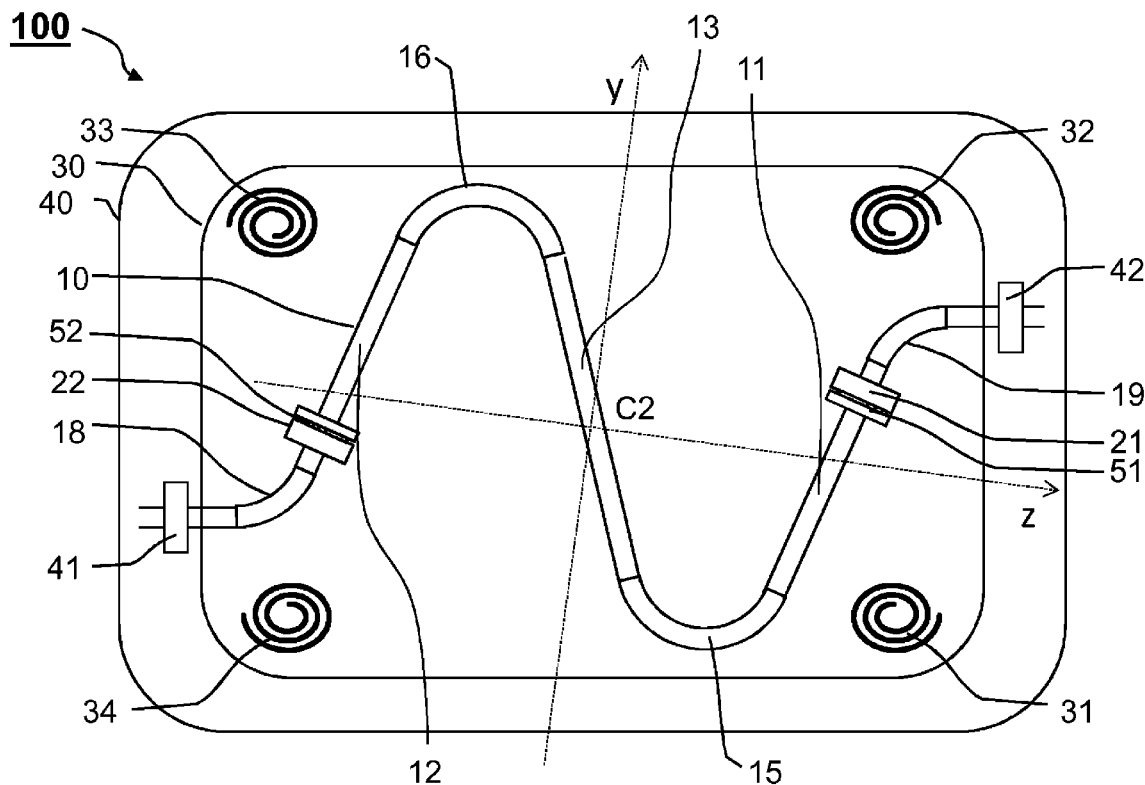
FIG. 1 shows a first exemplary embodiment of a sensor of a measuring device according to the present disclosure.

The first exemplary embodiment of a sensor 100 of a measuring device according to the invention shown in FIG. 1 comprises a measuring tube, in particular a one-piece measuring tube, also referred to as a measurement pipe 10, having a first straight external section 11, a second straight external section 12, and a central straight section 13, along with a first bent section 15 and a second bent section 16. The two straight external segments 15, 16 are each connected to the central straight section 13 by means of one of the bent sections 15, 16. The measurement pipe 10 is bordered by two bearing bodies 21, 22 and fastened to the latter on a rigid support plate 30. The measurement pipe 10 runs essentially in a pipe plane parallel to the support plate 30, which is spanned by a Y axis and a Z axis. The measurement pipe has a two-fold rotational symmetry about an axis of symmetry, which runs perpendicular to the pipe plane through a point C2 in the center of the central pipe section at the intersecting point of the Y axis and the Z axis. The measurement pipe has an internal diameter of 5 mm or less, for example. It is made of a metal, in particular stainless steel or titanium. The metallic support plate 30 has a thickness of 5 mm, for example. The support plate 30 has four spiral spring-loaded bearings 31, 32, 32, 33, 34, which in particular are cut out by means of a laser, and which likewise have the two-fold rotational symmetry relative to each other with respect to the axis of symmetry through the point C2. The support plate 30 is anchored to a housing plate 40 of a sensor housing by way of bearing bolts, not shown here, which are fixed in the center of the spring-loaded bearings. The effective rigidity of the spring-loaded bearing results from the length of the spiral cut-outs and the width thereof in relation to the width of the remaining material of the support plate 30. In the center, the spring-loaded bearings each have a bore for receiving a bearing pin.

By means of the spring-loaded bearings 31, 32, 33, 34, the support plate 30 has three degrees of translational vibration and three degrees of rotational vibration freedom, the natural frequencies of which are at least 70 Hz in order to avoid resonance vibrations, with vibrations of up to 50 Hz frequently occurring in process plants. In order not to impair the soft suspension of the support plate achieved by the spring-loaded bearings 31, 32, 33, 34, the measurement pipe can be connected to a pipeline via a sufficiently soft line inlet section 18 and a sufficiently soft line outlet section 19. The housing has first and second housing bearings 41 42, which are firmly connected to the housing plate 40 and to which the line inlet section 18 and the line outlet section 19 are fixed in order to suppress transmission of vibrations of the pipeline to the measurement pipe via the line inlet section 18 and the line outlet section 19. The degrees of translational and rotational vibration freedom of the support plate 20 each have natural frequencies $f_i$ which are proportional to the root of a quotient comprising a benchmark k and an idleness term m—that is to say $f_i \alpha (k_i/m_i)^{1/2}$. In sum, the line inlet section 18 and the line outlet section contribute not more than 10% to the respective benchmark $k_i$. In FIG. 1, the line inlet section 18 and the line outlet section 19 are shown essentially schematically. Stiffness and thus the contribution to the respective benchmark can be reduced by additional pipe length and bends. The line inlet section and the line outlet section are designed symmetrically with respect to each other to satisfy the C2 symmetry.

For exciting and detecting bending vibration modes of the measurement pipe, the sensor 100 comprises a first piezoelectric exciter and sensor unit and a second piezoelectric exciter and sensor unit 52, which are each held by one of the bearing bodies 21, 22. Details in this regard will be explained further below.

Figure 2:
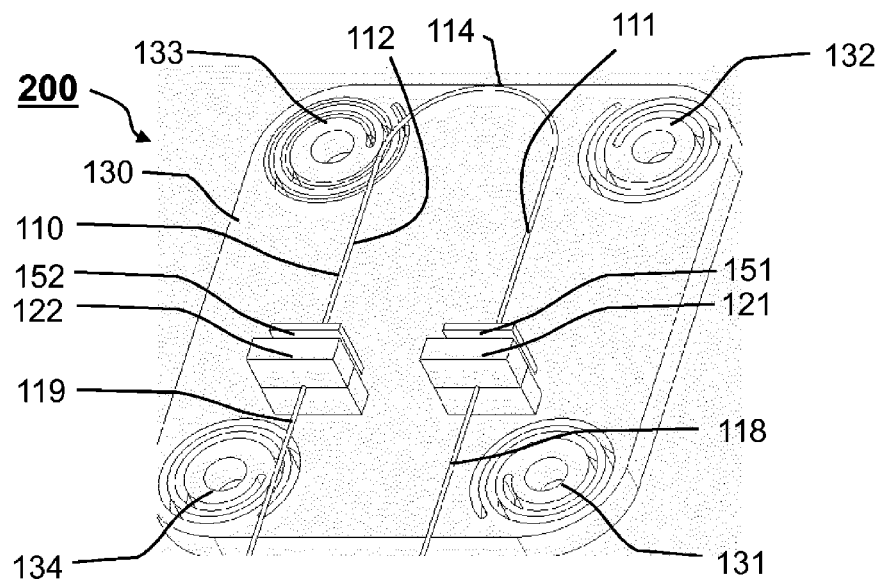
FIG. 2 shows a second exemplary embodiment of a sensor of a measuring device according to the present disclosure.

The second exemplary embodiment of a sensor 200 according to the invention shown in FIG. 2 comprises a measuring tube, in particular a one-piece measuring tube, also referred to as a measurement pipe 110, having a first straight section 111, a second straight section 112 and a bent section 114, which connects the two straight sections 111 112 to one another. The measurement pipe 110 is bordered by two bearing bodies 121, 122 and fastened to the latter on a rigid support plate 130. The measurement pipe 110 runs essentially in a pipe plane parallel to the support plate 130. Perpendicular to the pipeline plane, a mirror plane extends through the apex of the bent section 114. The measurement pipe has an internal diameter of 5 mm or less, for example. It is made of a metal, in particular stainless steel or titanium. The metallic support plate 130 has a thickness of 5 mm, for example. The support plate 130 comprises four spiral spring-loaded bearings 131, 132, 132, 133, 134, which are cut out in particular by means of a laser, and which are symmetrical relative to each other in pairs with respect to the mirror plane. Similar to the first exemplary embodiment, the support plate 130 may be anchored to a housing plate of a sensor housing. The effective rigidity of the spring-loaded bearings results from the length of the spiral cut-outs and the width thereof in relation to the width of the remaining material of the support plate 130. In the center, the spring-loaded bearings each have a bore for receiving a bearing. The statements relating to the first exemplary embodiment apply analogously to the function and dimensioning of the spring-loaded bearings.

In order to not impair the soft suspension of the support plate 130 achieved by the spring-loaded bearings 131, 132, 133, 134, the measurement pipe can be connected to a pipeline via a sufficiently soft line inlet section 118 and a sufficiently soft line outlet section 119. The line inlet section 118 and the line outlet section 119 are preferably fixed to the housing plate or other components of the housing, in order to suppress the transmission of vibrations of the pipeline to the measurement pipe via the line inlet section 118 and the line outlet section 119.

FIG. 2 shows the line inlet section 118 and the line outlet section 119 essentially schematically. Stiffness and thus the contribution to the respective benchmark can be reduced by additional pipe length and bends. The line inlet section and the line outlet section are designed symmetrically relative to each other with respect to the mirror plane.

For exciting and detecting bending vibration modes of the measurement pipe, the sensor 200 comprises a first piezoelectric exciter and sensor unit and a second piezoelectric exciter and sensor unit 152, which are each held by one of the bearing bodies 121, 122. Details in this regard will be explained further below.

Instead of the U-shaped profile shown in FIG. 2, the measurement pipe can also have other mirror-symmetrical shapes, for example a V shape, a W shape or an omega shape.

FIGS. 3a to 3d show various embodiments of sensor units or exciter units of sensors of measuring devices according to the invention.

Figure 3A:
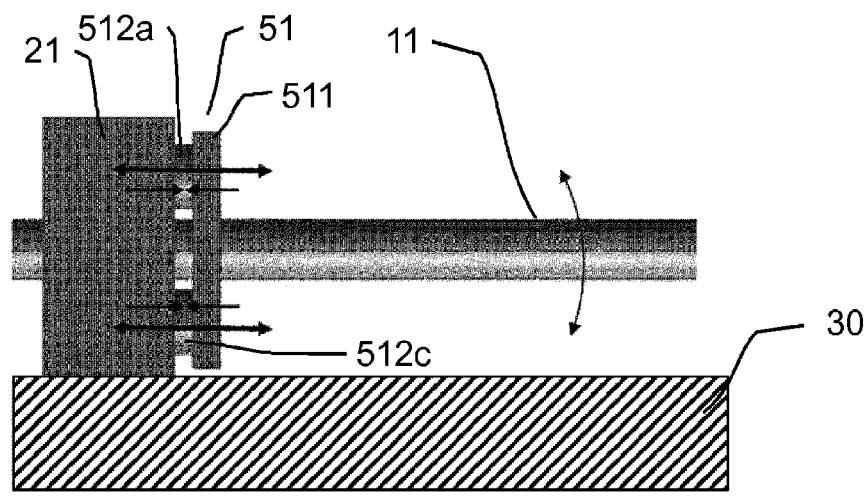
FIG. 3a shows a first exemplary embodiment of a sensor and exciter unit in a side view.

The principle of piezoelectric excitation and sensor technology will be explained based on the piezoelectric sensor-exciter unit 51 shown in FIG. 3a. Piezoelectric elements 512a, 512b are clamped above and below the measurement pipe section, between a bearing body 21, which anchors a measurement pipe section 11 to a support body 30, and a cover plate 511 of the sensor-exciter unit 51. The cover plate 511 is firmly connected to the measurement pipe section 511. By applying alternating voltages to at least one of the two piezoelectric elements 512a, 512b, the cover plate 511 is tilted periodically, and a bending moment is introduced into the measurement pipe section 11. As a result, a measurement pipe to which the measurement pipe section belongs can be excited to carry out bending vibrations. Since the vibrating measurement pipe section 11, in turn, introduces oscillating mechanical stresses into the piezoelectric elements 512a, 512b via the cover plate 511, a signal can be tapped at one or both piezoelectric elements, which is a function of the bending vibrations.

An advantage of this type of excitation and measurement is that no additional vibrating masses have to be mounted on the measuring tube for sensors or exciters. This is particularly advantageous for measuring tubes having small to very small diameters, for example DN<0 4 mm or DN<0 1 mm and DN<=0.5 mm.

Insofar as all bending vibration modes at the bearing body 21 have a vibration node, all fundamental bending vibration modes can be excited by way of the sensor-exciter unit 51, and modes can be used for measurement.

Figure 3B:
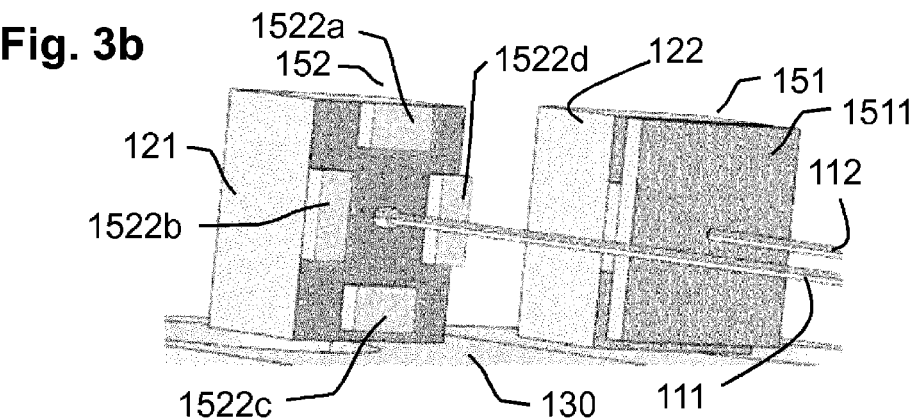
FIG. 3b shows the sensor and exciter units of the sensor shown in FIG. 2.
Figure 3C:
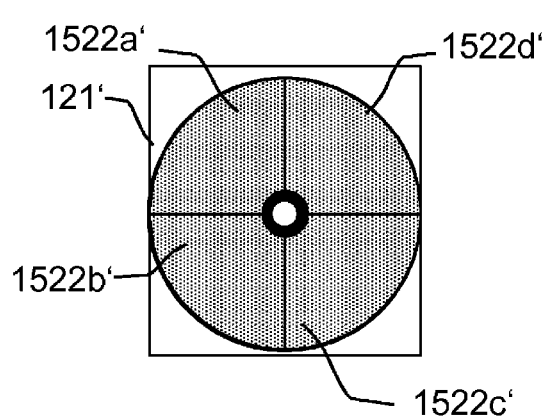
FIG. 3c shows an arrangement of piezo elements of a further exemplary embodiment of a sensor and exciter unit in a plan view.
Figure 3D:
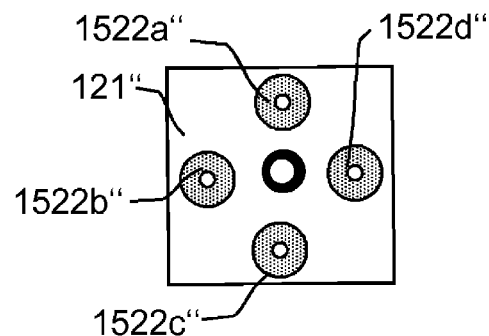
FIG. 3d shows an arrangement of piezo elements of a further exemplary embodiment of a sensor and exciter unit in a plan view.

By positioning 2×2 piezoelectric elements at the bearing bodies, "in-plane" modes of the pipeline plane and "out-ofplane" modes perpendicularly thereto can be excited and detected equally and simultaneously. Corresponding arrangements are shown in FIGS. 3b, 3c, and 3d, in each of which four piezo elements 1522a, 1522b, 1522c, 1522d; 1522a', 1522b', 1522c', 1522d'; 1522a", 1522b", 1522c", 1522d" are arranged at a bearing body 121; 121'; 121". In this case, the piezoelectric elements a and c or b and d are arranged opposite each other.

In order to excite a selected bending vibration mode, an excitation signal can be alternately applied to the matching pair of mutually opposing piezoelectric elements, or only one, while the other piezoelectric element of the pair serves as a sensor. However, it is also possible for both opposing piezoelectric elements of a pair to serve both as an exciter element and as a sensor element. The arrangements in FIGS. 3b and 3d can be simplified further by retaining only one of the piezoelectric elements of a pair shown in the drawings, namely one for exciting in-plane modes, for example the element denoted by "b", and one for exciting and detecting out-of-plane modes, for example the element denoted by "a". Of course, in the other bearing body, which is not shown here, the two piezoelectric elements are to be positioned in such a way that they are symmetrical with respect to the symmetry of the measuring tube relative to the piezoelectric elements at the bearing body shown. The piezoelectric elements can be fixed between the cover plate and the bearing body by adhesive bonding, clamping (FIGS. 3a, 3b, 3c, 3d) and/or screws (FIG. 3d).

Figure 4A:
FIG. 4a shows deflections of a U-shaped measuring tube at different vibration bending modes.
Figure 4A:
Figure 4A:
Figure 4A:
Figure 4A:
Figure 4A:
Figure 4A:
Figure 4A:
Figure 4A:

FIG. 4a shows the deflections of a U-shaped measuring tube of a measuring device according to the invention. More precisely, deflections of five out-of-plane modes OOP 1 to OOP 5 perpendicular to the plane of the measuring tube and four in-plane modes IP 1 to IP 4 in the plane of the measurement pipe are shown. All such modes can be excited and evaluated in the measuring device according to the invention. Nine frequencies between a few 100 Hz and 3 KHz are thus available to determine flow, density and further medium properties. It is apparent that the even-numbered OOP modes have an oscillation node at the apex of the measuring tube arc. The provision of a small additional mass body at the vertex barely influences the frequency of the even-numbered OOP modes, but the frequencies of the other modes can be shifted. In this way, the spacing of the frequencies can be adjusted to prevent crosstalk between bending vibration modes. Likewise, mass bodies can be symmetrically attached to vibration nodes. For example, at the near-arc vibration nodes of OOP 5.

Figure 4B:
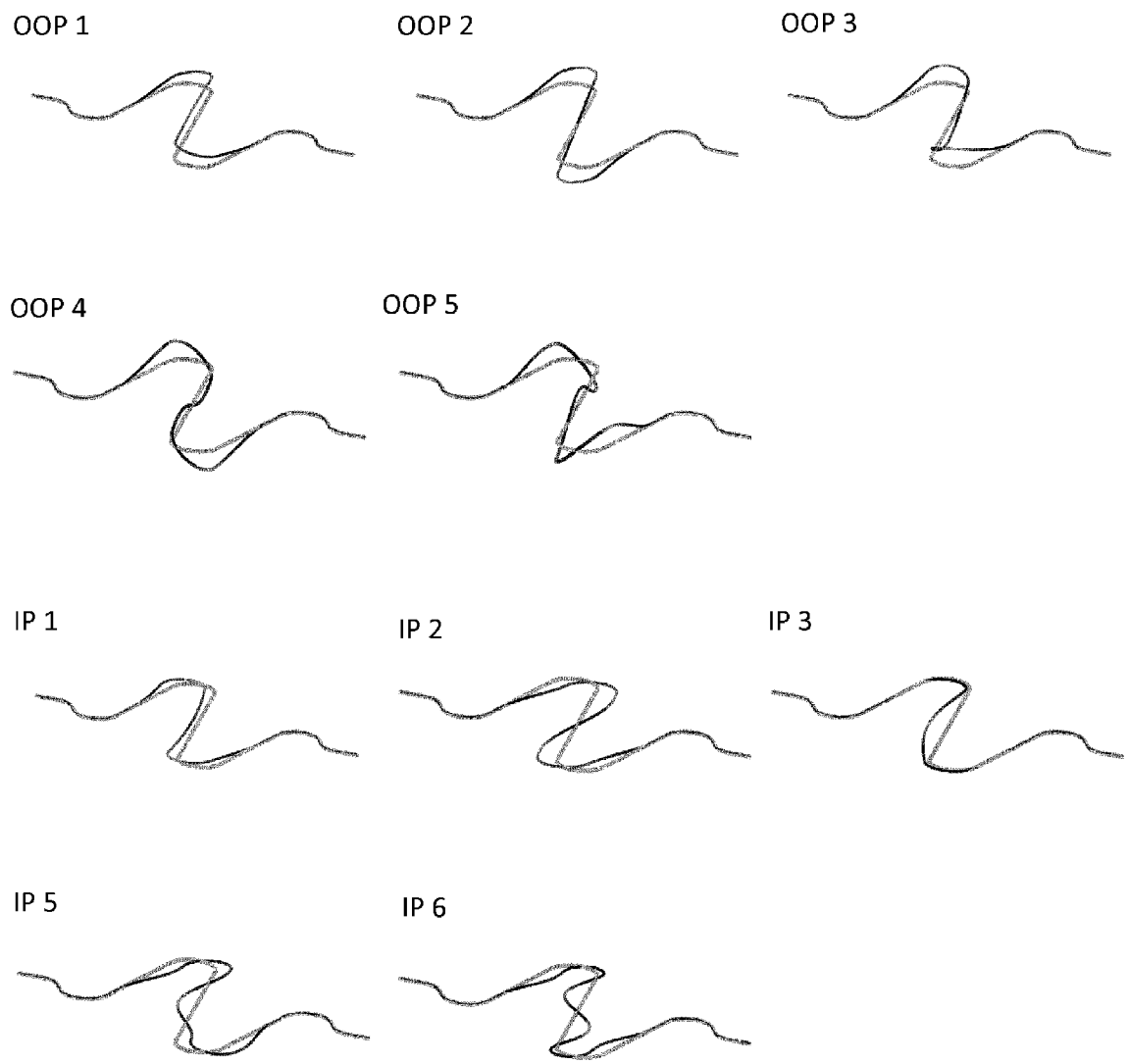
FIG. 4b shows deflections of an S-shaped measuring tube at different vibration bending modes.

FIG. 4b shows the deflections of an S-shaped measuring tube of a measuring device according to the invention. More precisely, deflections of five out-of-plane modes OOP 1 to OOP 5 perpendicular to the plane of the measuring tube and five in-plane modes IP 1 to IP 6 in the plane of the measurement pipe are shown. All such modes can be excited and evaluated in the measuring device according to the invention. Ten frequencies between a few 100 Hz and several kHz are thus available to determine flow, density and further medium properties. It is apparent that all even-numbered modes in the symmetry center of the C2 symmetry have a vibration node. The provision of a small additional mass body at this vertex barely influences the frequency of the even-numbered OOP modes, but the frequencies of the odd-numbered modes can be shifted. In this way, the spacing of the frequencies can be adjusted to prevent crosstalk between bending vibration modes. Likewise, mass bodies can be symmetrically attached to vibration nodes.

The invention claimed is:

1. A vibratory measuring device for determining a mass flow rate or a density of a flowable medium, the device comprising:
a vibratory measuring tube that is bent in the rest position thereof and configured to convey a medium therethrough, wherein the measuring tube has a measuring tube center line extending in a measuring tube plane;
a first bearing body disposed at or near an inlet side of the measuring tube;
a second bearing body disposed at or near an outlet side of the measuring tube;
a support body, wherein the first bearing body and second bearing body are connected to the support body, wherein the measuring tube is supported on the first bearing body and second bearing body such that bending vibration modes of the measuring tube have vibration nodes at the first bearing body and second bearing body;
a first exciter unit;
a second exciter unit, wherein the first and second exciter units are each configured to excite bending vibrations of the measuring tube both in the measuring tube plane and perpendicular to the measuring tube plane as a function of excitation signals;
a first sensor unit;
a second sensor unit, wherein the first and second sensor units are each configured to detect bending vibrations of the measuring tube both in the measuring tube plane and perpendicular to the measuring tube plane and configured to generate vibration-dependent sensor signals; and
an operation and evaluation circuit, wherein the operation and evaluation circuit is configured to supply excitation signals to the first and second exciter units as to selectively excite bending vibration modes and configured to receive the sensor signals of the sensor units.

2. The device of claim 1, wherein the measuring tube center line either extends symmetrically with respect to a measuring tube transverse plane, which is perpendicular to the measuring tube plane, or has a two-fold rotational symmetry with respect to an axis of symmetry extending perpendicular to the measuring tube plane, wherein the operation and evaluation circuit is configured to supply excitation signals to the first and second exciter units to excite and/or evaluate symmetrical bending vibration modes and/or antisymmetrical bending vibration modes.

3. The device of claim 1, wherein the measuring tube has a homogeneous mass distribution between the first exciter unit and the second exciter unit or between the first sensor unit and the second sensor unit, wherein a deviation from the homogeneous mass distribution is given at a trim point at a location of a vibration node of antisymmetrical bending vibration modes.

4. The device of claim 1, wherein the bending vibration modes have natural frequencies, and wherein in each case an amplitude of a bending vibration mode which is dependent on an excitation frequency is given as:

$$A_i(f_a, f_i, Q_i) = \frac{k_i}{\left[\left(1 - \left(\frac{f_a}{f_i}\right)^2\right)^2 + \left(\frac{\left(\frac{f_a}{f_i}\right)}{Q_i}\right)^2\right]^{1/2}},$$

wherein $f_i$ is the natural frequency, $A_i$ is the amplitude, $f_a$ is the excitation frequency, $k_i$ is a mode-specific constant, and $Q_i$ describes a mode-specific quality of the measuring tube, wherein the following applies for the N bending vibration modes having the N lowest natural frequencies $f_i$, $f_j$:

$$\frac{A_i\left(\frac{f_i + f_j}{2}, f_i, Q_i\right)}{k_i \cdot Q_i} < s,$$

wherein s is less than 2%, and N greater than or equal to 5.

5. The device of claim 4, wherein s is less than 0.5%, and N is greater than or equal to 10.

6. The device of claim 1, wherein the bending vibration modes have natural frequencies, and wherein in each case an amplitude of a bending vibration mode which is dependent on an excitation frequency fa is given as:

$$A_i(f_a, f_i, Q_i) = \frac{k_i}{\left[\left(1 - \left(\frac{f_a}{f_1}\right)^2\right)^2 + \left(\frac{\left(\frac{f_a}{f_1}\right)}{Q_1}\right)^2\right]^{1/2}},$$

wherein $f_i$ is the natural frequency, $A_i$ is the amplitude, $f_a$ is the excitation frequency, $k_i$ is a mode-specific constant, and $Q_i$ describes a mode-specific quality of the measuring tube, wherein the operation and evaluation circuit is configured to excite only bending vibration modes having natural frequencies $f_i$, $f_j$, for which the following applies:

$$\frac{A_i\left(\frac{f_i + f_j}{2}, f_i, Q_i\right)}{k_i \cdot Q_i} < s,$$

wherein s is less than 1%.

7. The device of claim 6, wherein s is less than 0.25%.

8. The device of claim 1, wherein the measuring tube has an internal diameter that measures no more than 6 mm.

9. The device of claim 8, wherein the internal diameter is no more than 0.5 mm.

10. The device of claim 1, wherein the first exciter unit and second exciter unit each comprise at least two piezoelectric elements, which are configured to be selectively driven by the operation and evaluation circuit via the excitation signals.

11. The device of claim 1, wherein the first sensor unit and second sensor unit each comprise at least two piezoelectric elements, the respective sensor signals of which are detected by the operation and evaluation circuit.

12. The device of claim 1, wherein the first sensor unit and the first exciter unit are integrated into a first sensor-exciter unit, and the second sensor unit and the second exciter unit are integrated into a second sensor-exciter unit.

13. The device of claim 12, wherein the first and second sensor-exciter units comprise piezoelectric elements, which are each configured to operate both as an exciter and as a sensor.

14. The device of claim 12, wherein the first and second sensor-exciter units each comprise first piezoelectric elements configured to operate as exciters, and wherein the first and second sensor-exciter units each comprise second piezoelectric elements configured to operate as exciters.

* * * * *